(12) United States Patent
Rettig et al.

(10) Patent No.: US 11,838,290 B2
(45) Date of Patent: *Dec. 5, 2023

(54) HYBRID DATA MANAGED LOCK SYSTEM

(71) Applicant: Schlage Lock Company LLC, Carmel, IN (US)

(72) Inventors: Raymond F. Rettig, Fishers, IN (US); Donald L. Beene, Noblesville, IN (US); Frank L. Coolidge, Noblesville, IN (US); Daniel R. Sharp, Golden, CO (US); Michael Cahill, Carmel, IN (US); Srikanth Venkateswaran, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/002,373

(22) Filed: Aug. 25, 2020

(65) Prior Publication Data

US 2021/0211420 A1 Jul. 8, 2021

Related U.S. Application Data

(63) Continuation of application No. 16/175,351, filed on Oct. 30, 2018, now Pat. No. 10,757,098, which is a continuation of application No. 14/611,144, filed on Jan. 30, 2015, now Pat. No. 10,116,655.

(60) Provisional application No. 61/933,838, filed on Jan. 30, 2014.

(51) Int. Cl.
*H04L 29/06* (2006.01)
*H04L 9/40* (2022.01)
*H04L 67/10* (2022.01)
*G07C 9/00* (2020.01)

(52) U.S. Cl.
CPC ...... *H04L 63/0853* (2013.01); *G07C 9/00817* (2013.01); *H04L 67/10* (2013.01); *G07C 9/00309* (2013.01); *G07C 2009/00841* (2013.01)

(58) Field of Classification Search
CPC . H04L 63/0853; H04L 67/10; G07C 9/00817; G07C 9/00309; G07C 2009/00841
See application file for complete search history.

(56) References Cited

U.S. PATENT DOCUMENTS

| 5,198,643 | A | * | 3/1993 | Miron | G07C 9/00904 235/382 |
| 5,986,564 | A | | 11/1999 | Fraser | |
| 7,145,434 | B2 | | 12/2006 | Mlynarczyk et al. | |
| 2003/0071715 | A1 | * | 4/2003 | Lavelle | G07C 9/21 340/5.5 |
| 2004/0160305 | A1 | * | 8/2004 | Remenih | G07C 9/00182 340/5.6 |

(Continued)

*Primary Examiner* — Joseph P Hirl
*Assistant Examiner* — Chi D Nguy
(74) *Attorney, Agent, or Firm* — Taft Stettinius & Hollister LLP

(57) ABSTRACT

A residential key may be programmed by a computer with access rights information. A lock device may receive the access rights information from the residential key. The lock device may store and utilize the access rights information if the lock determines that the residential key is authorized to update the lock device.

18 Claims, 21 Drawing Sheets

(56) References Cited

U.S. PATENT DOCUMENTS

| | | | | |
|---|---|---|---|---|
| 2004/0207509 A1* | 10/2004 | Mlynarczyk | ....... | G07C 9/00817 340/5.23 |
| 2005/0179544 A1* | 8/2005 | Sutton | ................ | G07C 9/00817 340/543 |
| 2009/0085717 A1* | 4/2009 | Kirkjan | .............. | G07C 9/00309 340/5.2 |
| 2011/0001603 A1 | 1/2011 | Willis | | |
| 2012/0157080 A1* | 6/2012 | Metivier | ............ | G07C 9/00309 455/420 |
| 2012/0222103 A1* | 8/2012 | Bliding | ............. | G07C 9/00309 726/7 |

* cited by examiner

One maxim page has 32 bytes. Each byte has 8 bits. So a blank maxim page will look like the following:
00000000 00000000...(224 zeros)....00000000 00000000

We are putting the CRC at the end so it looks like so...
00000000 00000000...(224 zeros)....00000000 (crc)

Each zero represents a page on the maxim key like so...
00000000 00000000...(224 zeros)....00000000 (crc)
^^^^^^^^                                   ^^^ Page 247
||||||||                                   +--- Page 246
||||||||                                   +--- Page 245
||||||||                                   +--- Page 244
||||||||                                   +--- Page 243
||||||||                                   +--- Page 242
||||||||                                   +--- Page 241
||||||||                                   +--- Page 240
||||||||
||||||||  <--- Pages 16 - 239
||||||||
|||||||+--- Page 15
||||||+---- Page 14
|||||+----- Page 13
||||+------ Page 12
|||+------- Page 11
||+-------- Page 10
|+--------- Page 9
+---------- Page 8
|+--------- Page 7
|+--------- Page 6
|+--------- Page 5
|+--------- Page 4
|+--------- Page 3
|+--------- Page 2
|+--------- Page 1
+---------- Page 0

Pages 0 and 1 above will never be set.

So if you want the simple example, of data only in page 2 on ibutton, it would be...
= 00100000 00000000...(224 zeros)....00000000 (crc)
= 0x20     0x00     (lots zeros)     0x00     0xC8

Another example, with pages 2, 3, 4, 5 having data...
= 00111100 00000000...(224 zeros)....00000000 (crc)
= 0x3C     0x00     (lots zeros)     0x00     (some calculated crc here)

Suzy's key
Serial #: 11335577

| door | User pos. | Repl. serial # | New flag | attribute |
|---|---|---|---|---|
| 1 | 30 | 11002299 | 00 | Normal |

902

Lock #1 (Suzy's apartment)

| User pos. | serial # | attribute |
|---|---|---|
| 30 | 11335577 | normal |

| Suzy's key | | | |
|---|---|---|---|
| Serial #: 22446688 | | | |
| door | User pos. | Repl. serial # | New flag | attribute |
| 1 | 30 | 11335577 | 01 | Normal |

904

| Lock #1 (Suzy's apartment) | | |
|---|---|---|
| User pos. | serial # | attribute |
| 30 | 11335577 | normal |

| Suzy's key  Serial #: 22446688 | | | |
|---|---|---|---|
| door | User pos. | Repl. serial # | New flag | attribute |
| 1 | 30 | 11335577 | 00 | Normal |

910

| Lock #1 (Suzy's apartment) | | |
|---|---|---|
| User pos. | serial # | attribute |
| 30 | 22446688 | normal |

Lost key
Serial #: 11335577

| door | User pos. | Repl. serial # | New flag | attribute |
|---|---|---|---|---|
| 1 | 30 | 11002299 | 00 | Normal |

902

Lock #1 (Suzy's apartment)

| User pos. | serial # | attribute |
|---|---|---|
| 30 | 22446688 | normal |

Jim's key
Serial #: 44556699

| door | User pos. | Repl. serial # | New flag | attribute | Act. date | Exp. date | Time zone |
|---|---|---|---|---|---|---|---|
| 1 | 25 | 11335577 | FFFFFFFF | 00 | Normal | Nov 19, 2012 | June 4, 2014 | 02 |
| 5 | 28 | 11335577 | 11335577 | 00 | Normal | Nov 19, 2012 | June 4, 2014 | 02 |
| 2 | 19 | 11335577 | 22446688 | 00 | Normal | Nov 19, 2012 | June 4, 2014 | 02 |

1022

Lock #1 (Jim's old apartment)

| User pos. | serial # | attribute | Act. date | Exp. date | Time zone |
|---|---|---|---|---|---|
| 25 | 44556699 | Normal | Nov 19, 2012 | June 4, 2014 | 02 |

1024

Lock #5 (Complex main entrance)

| User pos. | serial # | attribute | Act. date | Exp. date | Time zone |
|---|---|---|---|---|---|
| 28 | 44556699 | Normal | Nov 19, 2012 | June 4, 2014 | 02 |

1026

Lock #2 (Vacant apartment)

| User pos. | serial # | attribute | Act. date | Exp. date | Time zone |
|---|---|---|---|---|---|
| 19 | 44556699 | Normal | Nov 19, 2012 | June 4, 2014 | 02 |

FIG. 10D

HYBRID DATA MANAGED LOCK SYSTEM

CROSS REFERENCE TO RELATED APPLICATION

The present application is a continuation of U.S. patent application Ser. No. 16/175,351 filed Oct. 30, 2018 and issued as U.S. Pat. No. 10,757,098, which is a continuation of U.S. patent application Ser. No. 14/611,144 filed Jan. 30, 2015 and issued as U.S. Pat. No. 10,116,655, which claims the benefit of U.S. Provisional Patent Application No. 61/933,838 filed Jan. 30, 2014, the contents of each application are hereby incorporated by reference in their entirety.

BACKGROUND

The present invention generally relates to a hybrid data management lock system. Data including access rights may be used in various systems and managed in various ways. Access privileges may be added to a resident one of following common ways: (1) The building administrator can grant the user privileges in a central database and then use a handheld computer to transfer these new access privileges to all doors that need updating. But this requires the administrator to visit each lock being updated. (2) Adding privileges to a key which is given to a resident who then applies the key to the locks they have been given access to, and then returns the key back to the admin briefly so that the central database can be aware of which locks have been updated. In this case the administrator has to handle the same key twice at different points in time. (3) Adding privileges to a key via a reader, located on a part of the property with which every resident must pass as they enter the facility, also known as a hotspot reader. In this case, there is the extra cost of a hotstpot reader to the system and the facility must be setup to funnel all residents through this hotspot reader which is not practical with some ways facilities are setup physically, such as one where all doors are exterior facing and directly accessed from the street. Thus, some existing systems have various shortcomings relative to certain applications. Accordingly, there remains a need for further contributions in this area of technology.

SUMMARY

One embodiment of the present invention is a unique data management lock system. Other embodiments include apparatuses, systems, devices, hardware, methods, and combinations for managing data in a lock system. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein:

FIG. 5 is a schematic diagram of some bit fields of an exemplary key;

FIGS. 9A-9D are schematic diagrams of an exemplary use case for removing a lost key from a lock device; and FIGS. 10A-10E are schematic diagrams of an exemplary use case for re-enabling an inhibited a user from a lock device.

DETAILED DESCRIPTION OF EXEMPLARY EMBODIMENTS

Figure 1:
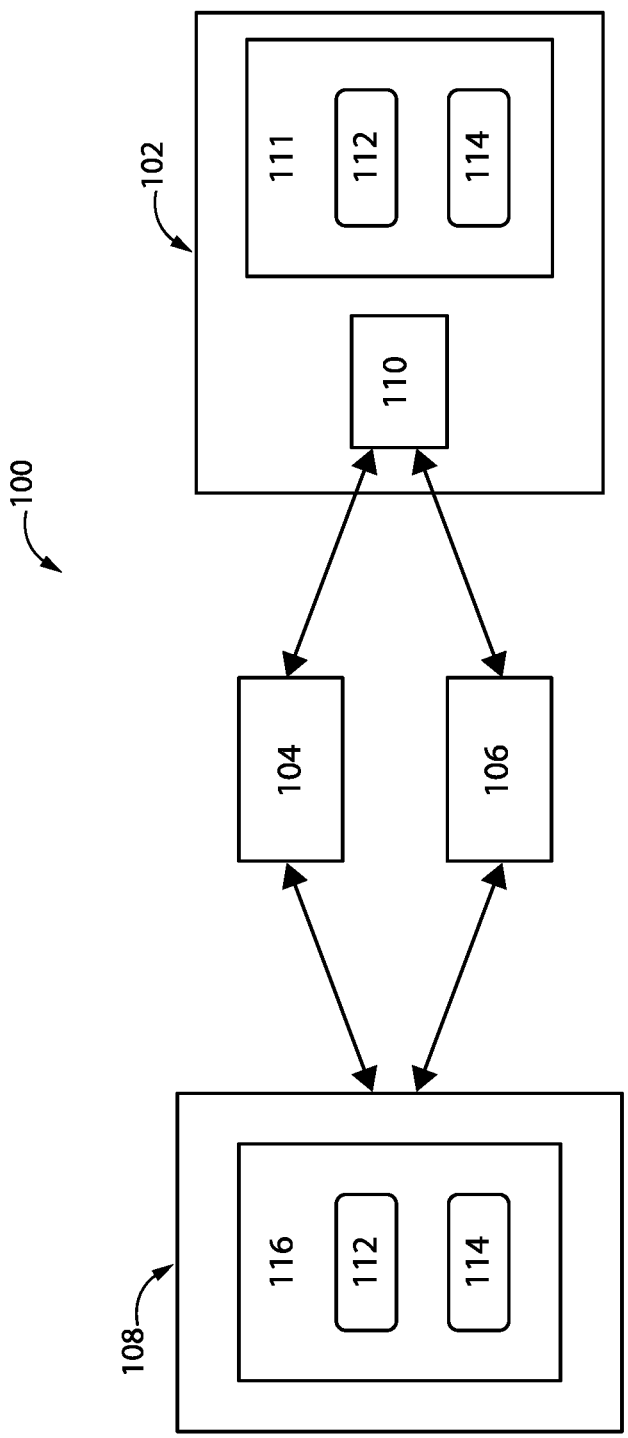
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates a system 100 that includes one or more lock devices 102, a residential key 104, an inhibit key 106, and a computer 108. The system 100 may be used in buildings with locks securing doors such as apartment complexes, condominiums, hotels, school campuses, commercial offices, and the like.

The lock device 102 may be an electronic lock to control access to a location. For example, the lock device 102 may be located on or near a door. The lock device 102 generally includes one or more types of readers 110. For example, the lock device 102 may be able to read iButton keys, smart card credentials via NFC, Bluetooth credentials, and/or prox, among other types of technologies. The lock device 102 may include a database 111 for storing audit trails 112 and/or access rights information 114. For example, the access rights information 114 in the lock device 102 may include a list of users or keys that should be granted access. The lock device 102 may include other components not shown FIG. 1, such as microprocessor, as known by those skilled in the art.

The residential key 104 is generally a key used by a resident for normal usage to enter into the rooms, apartments, condominiums, and/or offices secured by the lock device 102. The inhibit key 106 is generally a key used by an admin for the system 110. The inhibit key 106 generally has the ability to remove at least one user from the lock device 102. It is contemplated that the residential key 104 may have the ability to remove at least one user from the lock device 102.

The computer 108 may be any type of computer such as a desktop computer, laptop computer, server, tablet computer, a smartphone, and the like. The computer 108 generally maintains a database 116 of access rights for all of the lock devices 102 and users in the system 100. The computer 108 also programs the residential keys 104 and the inhibit keys 106 with the access rights information 114, typically, via a peripheral device (not shown). It is contemplated that the computer 108 may receive audit trails 112 from the lock devices 102 via the residential keys 104, the inhibit keys 106, and/or a handheld computing device (not shown). The database 116 may use the audit trails and/or time tracking on the lock devices 102 to determine which users have gone through particular lock devices 102. In some embodiments, the database 116 may be maintained in a server (not shown) in which the computer 108 downloads access rights from the server and uploads audit trails to the server.

The lock device 102 determines the keys that are allowed access. Generally, the lock device 102 will deny access to a residential key 104 if either of the following is true: (1) when a residential key 104 with a matching serial number has a particular code, such as DWA (delete with alarm), as an attribute; or (2) when a residential key 104 is pointing to a specific slot number for the first time does not match the previous replacement ID in the lock device 102. It is contemplated that other criteria may be used to deny access.

The system 100 may be able to perform the following functions without touring with a handheld computing device, but by programming a key (residential key 104 or inhibit key 106) with the computer 108 and not requiring the key to be returned back to the computer 108 with database 116. For example, a user can be added to one or more lock devices 102 during normal move-out and move-in situations by programming a residential key 104 with access rights information with the computer 108. The user then presents the residential key 104 to the lock device 102 and the lock device 102 updates its database of access rights with the access rights information from the residential key 104 such as adding that particular residential key 104 to its database.

As another example, a lost residential key can be replaced for any of the lock devices 102. If a residential key 104 is lost, the administrator, using computer 108, can program a new residential key 104 for a particular lock device 104 (e.g., for an apartment) and give this residential key 104 to the user. The new residential key 104 will have privileges to all the same doors (i.e., lock devices 102) as the lost key did. When the new residential key 104 is applied to each lock device 102, the lock device 102 will remove the lost key's privileges from its database and add the new residential key's information and/or privileges.

As yet another example, an administrator has the ability to apply the inhibit key 106 to any of the lock devices 102 affected by a lost and/or stolen residential key 104. The inhibit key 106 may be programmed by the computer 108 with access rights information to remove one or more residential keys 104 from having access to one or more lock devices 102. The programmed inhibit key 106 can then be presented to any of the affected lock devices 102 to the stolen and/or lost key's privileges from each lock device 102. The inhibit key 106 may be used to remove access immediately for the lost residential key 104, instead of waiting for the resident to apply the replacement residential key 104 at leisure. The lock devices 102 affected by the lost/stolen residential keys will respond the same regardless of the order of presentation of the inhibit key 106 or the replacement residential key 104.

It is also contemplated that the lock device 102 may indicate if all lock devices 102 that need inhibiting have been successfully inhibited. For example, each lock device 102 may write data to the inhibit key 106 for the next lock device 102 to read and determine whether any other lock devices 102 have not been updated.

The system 100 may also provide the ability to interrogate the database at the lock device 102 and audit who went thru the door (lock device 102 will show which residential key 104 (e.g., a credential) is in what slot) in specific circumstances where the computer 108 is unable to resolve accurate audits.

The system 100 generally has the ability to change access privileges at the lock devices 102 remotely by having data (e.g., access rights information) moved from the residential key 104 onto the lock device 102. Whether this data is observed or rejected by the lock device 102 may be dependent upon the data in the lock device 102. Typically, before a residential key 104 is added to the lock device 102, there may be a series of data checks that the lock device 102 may perform on data in the residential key 104: (1) Does the residential key 104 belong to the facility (i.e., the apartment complex, school or office campus, hotel, etc.)? (2) Does the residential key 104 belong to this lock device 102? (3) Is the residential key 104 flagged as "should not be added to the lock device"? (4) Does the residential key 104 know some information specific about this lock device 102 such as who used to be in a specific slot in the lock device database? Generally, if the answer is yes to all of the questions except #3 then the residential key 104 will be added to the lock device 102. It is contemplated that other questions may be used in other embodiments, including using fewer questions or more questions.

Figure 2:
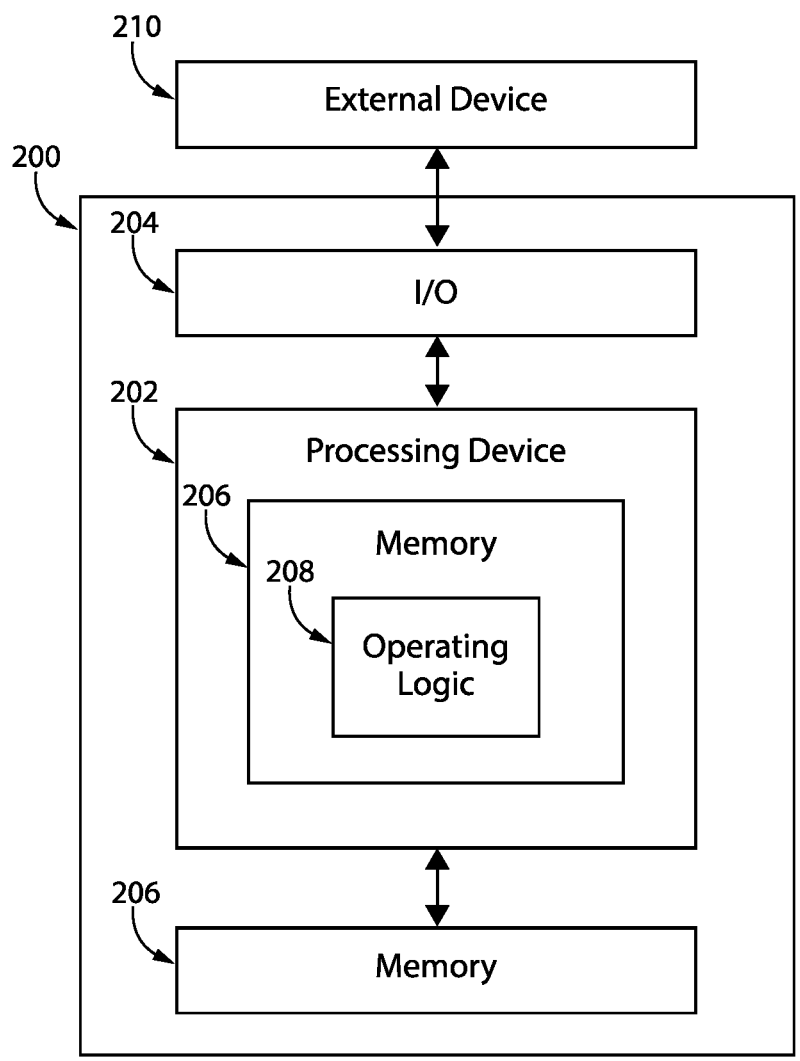
FIG. 2 is a schematic block diagram of a computing device.

FIG. 2 is a schematic block diagram of a computing device 200. The computing device 200 is one example of a lock device, computer, server, or mobile device which may be utilized in connection with the lock device 102 and the computer 108 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computing device 200. For example, the external device 210 may be a key (e.g., a residential key 104 and/or inhibit key 106), various types of credentials, mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
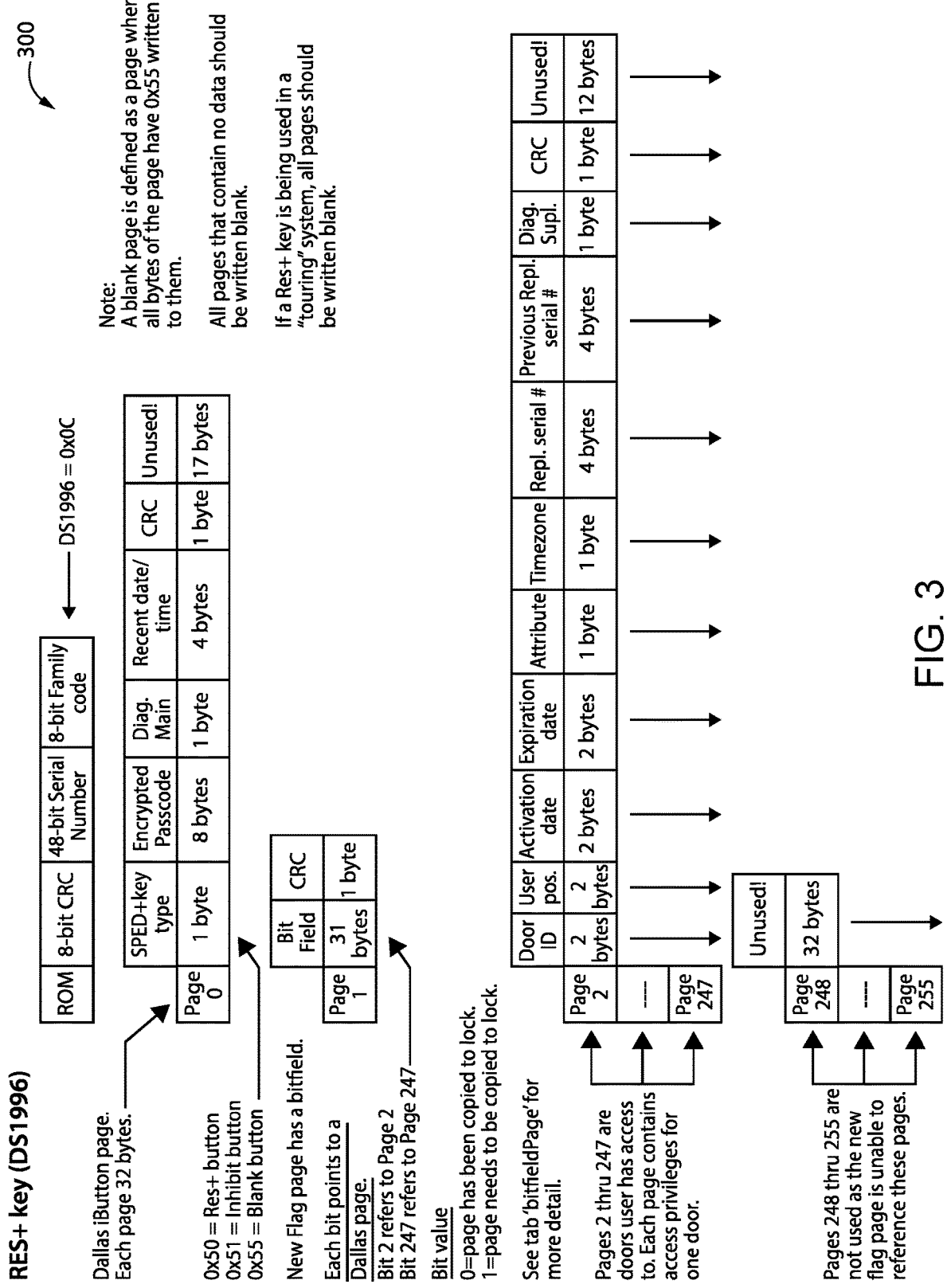
FIG. 3 is a schematic diagram of some data fields of an exemplary residential key.

FIG. 3 is a schematic diagram of some of the data fields 300 in an exemplary residential key 104. The residential key 104 may include one or more of the following fields, some of which are illustrated in FIG. 3. Encrypted Passcode field can be 8 bytes long. Bit Field (31 bytes)—The bit field is a one-to-one mapping to indicate the status for each row of accesses listed in the residential key 104. Each row may be a separate privilege. For example, when the computer 108 writes a new privilege to the residential key 104 or changed an existing privilege the corresponding bit in the bit field should be set. When set it indicates to the lock device 102 this data is new or has been changed. This bit will be cleared, usually only by the lock device 102, after the lock device 102 has finished processing the privilege. Door ID (2 bytes)—This is the point ID, or POO, of the 'FOO-GOOPOO' value. The POO can be up to a value of 9999 decimal so this maximum value can fit inside 2 bytes. User Position (2 bytes)—The slot number/position of the residential key 104 in the lock's user access list/database. There may be a total of 500 slot positions available. Activation date (2 bytes)—The date the user is allowed to start accessing the lock device 102. Value represented as day counter since midnight of Dec. 31, 1969/Jan. 1, 1970. Expiration date (2 bytes)—The day the user rights to the lock device 102 are removed. Value represented as day counter since midnight of Dec. 31, 1969/Jan. 1, 1970. Attribute (1 byte)—Special attribute of the credential. Normal (0x0B), Supervised (0xCB), Freeze (0x8B), Pass Through (0x03), Dogged (0x00), One Time Use (0x4B), Toggle (0x33), Delete with Alarm (0x07), CT Aux (0x0C), CT Main and Aux (0x0D). Timezone (1 byte)—Bitfield that denotes which of 8 timezones in the computer 108 the user belongs to. Replacement residential key serial # (4 bytes)—When the residential key 104 is added to the lock device 102, this typically will be the serial number of the residential key it is replacing for this user position. Previous replacement of residential key serial # (4 bytes)—Serial number of the residential key that resided in this user position before the replacement residential key serial number. CRC (1 byte)—Cyclic Redundancy Check CRC for the row of data for each page. Diagnostic Main (1 byte)—This is defaulted to 00. Set to 01 by lock device 102 when the residential key processing starts. This is reset back to 0x00 only when there was no residential key communication issue during processing. If a key is brought to the computer 108 and this byte is set to 01 it indicates that data "tearing" or residential key bobbling had occurred.

Another possible field includes Diagnostic Supplement (1 byte)—This is a bit field and defaulted to 00. Bit 0: 1=programming key mismatch between the computer 108 and the lock device 102. Bit 1: 1=either replacement serial number or previous replacement serial number failed to match the user indicated in the database when adding the residential key 104 to the database for the first time. Bit 2: 1=lock denied access, outside of user time zone. Bit 3: 1=lock has wrong date/time. Determined by comparing between the time in the lock device 102 with the Recent date/time field on the key written by the computer 108. If time in key is more recent than the time in the lock device 102 then this bit is set. Bit 4: 1=lock device 102 has low battery. If the user reported trouble with the lock device 102 when the residential key 104 was applied, and the computer 108 observes that Diagnostic Supplement=0x00 and Diagnostic Main=0x00 this most likely indicates that the residential key 104 was presented to a lock device 102 with an outdated version firmware. Generally, because a residential key 104 is not required to hold all lock devices that a user may have authorization for, the Diagnostic Supplement field may only be updated (if needed) when a residential key 104 has been added to the lock database. Another field is Recent date/time (4 bytes)—second counter based on Jan. 1, 1970.

In addition, in some embodiments, when a facility is operating in non-touring mode, the residential keys 104 typically will have the encrypted passcode (bytes PAS0—PAS15) written for authentication and will write blank bytes to the area where the scrambled programming key (PKID0-PKID7) was located.

Figure 4:
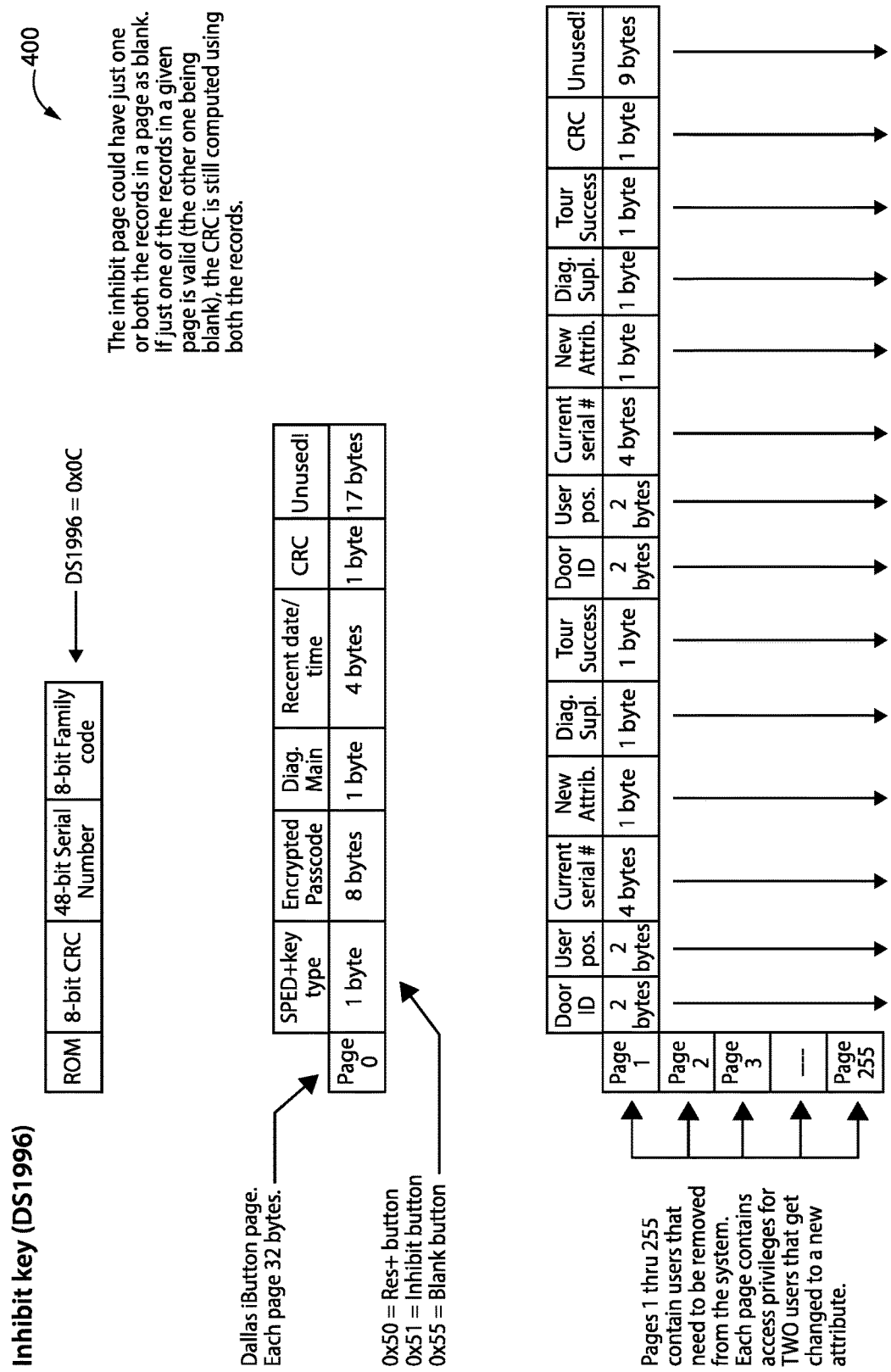
FIG. 4 is a schematic diagram of some data fields of an exemplary inhibit key.

FIG. 4 is a schematic diagram of some data fields 400 in an exemplary inhibit key 106. The inhibit key 106 may include one or more of the following fields, some of which are illustrated in FIG. 4. Door ID (2 bytes)—Same as described above for residential key 104. User Position (2 bytes)—Same as described above for the residential key 104. Current serial number (4 bytes)—This is the residential key 104 serial number in the lock device 102 that is to have its attribute changed. If the current serial number is not at the specified user position in the lock device 102 then the lock device 102 will write the current serial number over the value in the lock device 102. Tour success (1 byte)—Initially set to '0' by the computer 108 during programming of the inhibit key 106. This field will be set to '1' by the lock device 102 when the inhibit key 106 has been presented to the lock device 102 and the lock device 102 has updated its database to inhibit the user. Attribute (1 byte)—indicates the new attribute to set. This can be any attribute but will be one of the following two most of the time: (1) DWA (delete with alarm): For example, the administrator wants to remove a user from the lock device 102 but wants to know when they attempt to gain access to the lock device 102 with their residential key 104. In this circumstance, the lock device 102 may sound alarm, send an alarm message to a central, administrative computer, and/or note in an audit trail that the old key was used. (2) Normal: Typically used in situation where a user replaced a lost key and this key is its replacement.

Other fields may include CRC (1 byte)—CRC for the row of data for each page. The inhibit page could have just one or both the records in a page as blank. If just one of the record in a given page is valid (the other one being blank), the CRC is still computed using both the records. Encrypted Passcode (8 bytes). Diagnostic Main (1 byte)—Same as described above for the residential key 104. Diagnostic Supplement (1 byte)—Similar to described above for the residential key 104, but only some of the error codes are used. This is a bit field and defaulted to 00. Bit 0: 1=programming key mismatch between the computer 108 and the lock device 102. Bit 3: 1=lock device 102 has wrong date/time. Determined by comparing between the time in the lock device 102 with the Recent date/time field on the key written by the computer 108. If time in the key is more recent than the time in the lock device 102 then this bit is set. Bit 4: 1=lock device 102 has low battery. Another possible field may include Recent date/time (4 bytes)—second counter based on Jan. 1, 1970.

FIG. 5 is a schematic diagram of one implementation of bit fields of an exemplary key such as the residential key 104 and/or the inhibit key 106. Other bit fields are contemplated in other embodiments.

Figure 6A:
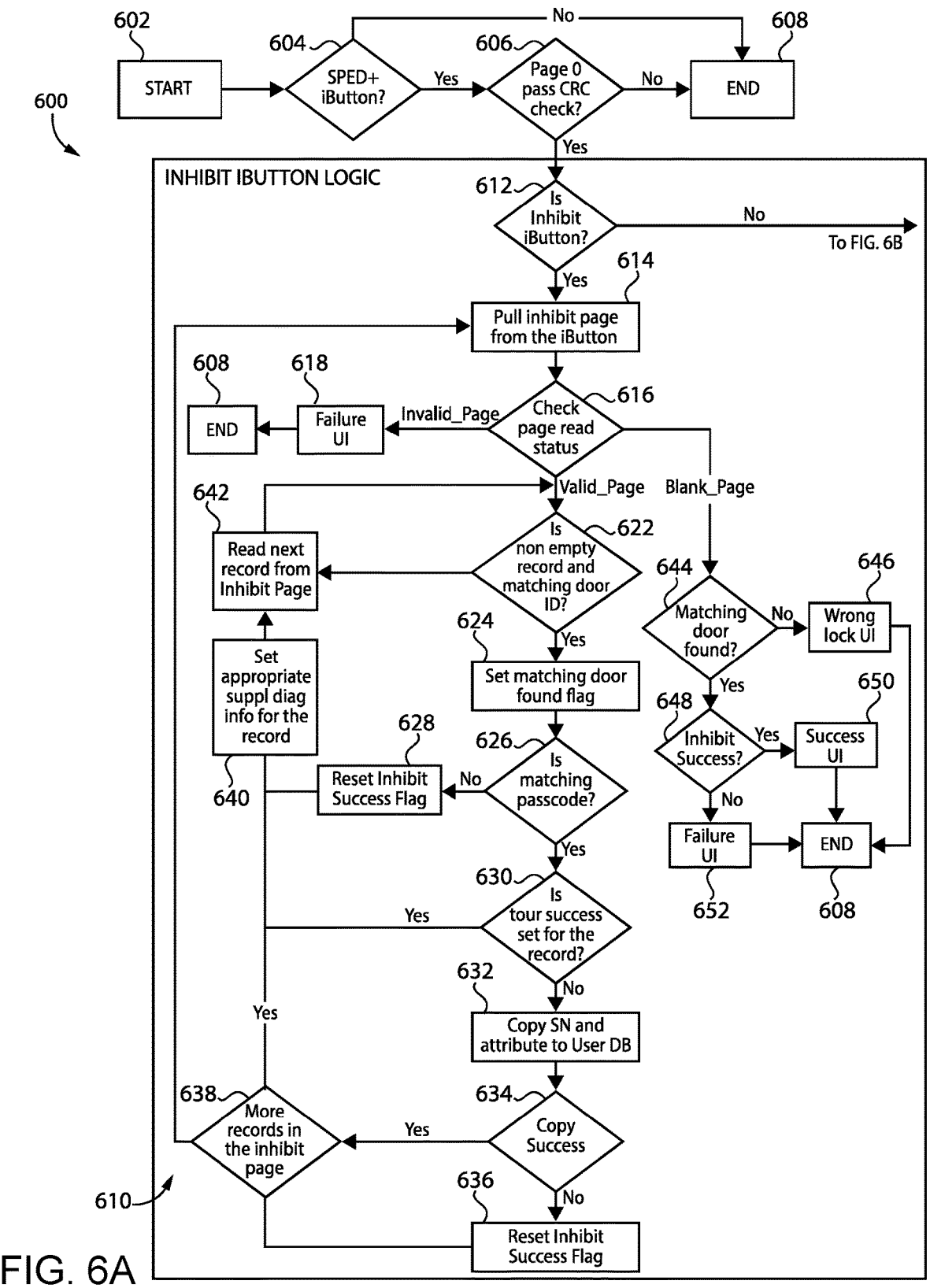
FIGS. 6A and 6B illustrate a schematic flow diagram of an exemplary procedure for updating data on a lock device.
Figure 6B:
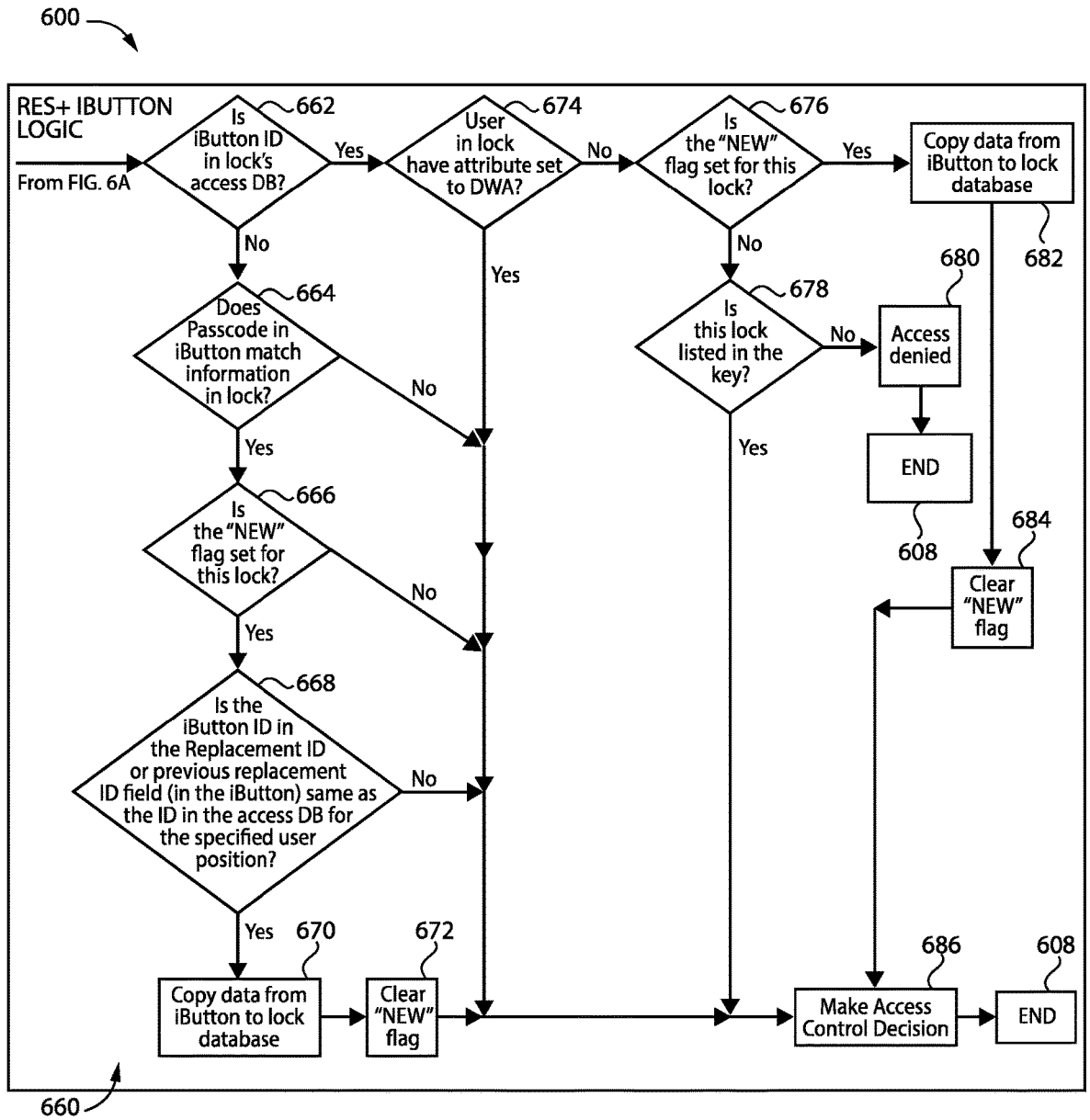

FIGS. 6A and 6B illustrate a schematic flow diagram of an exemplary procedure 600 for updating data in a lock device 102 using a residential key 104. Operations illustrated for all of the processes in the present application are understood to be examples only, and operations may be combined or divided, and added or removed, as well as re-ordered in whole or in part, unless explicitly stated to the contrary.

Procedure 600 begins at operation 602, which may be triggered by an interrupt or during a polling operation, for example. From operation 602, procedure 600 continues to conditional 604 to determine whether operation 602 was triggered by a key such as residential key 104 or inhibit key 106. If operation 602 was not triggered by a key, procedure 600 continues to operation 608, where procedure 600 ends. If operation 602 was triggered by a key, procedure 600 continues to conditional 606. At conditional 606, a data validity check is performed, such as a cyclic redundancy check (CRC), to determine whether the interaction contains valid data. If it is determined that the interaction does not contain valid data, procedure 600 continues to operation 608, where procedure 600 ends. If it is determined that the interaction does contain valid data, procedure 600 continues to inhibit key logic sub-procedure 610 at conditional 612 to determine whether the key that triggered operation 602 is an inhibit key 106. If it is determined that the key that triggered operation 602 is not an inhibit key 106, procedure 600 continues to residential key logic sub-procedure 660 at conditional 662 which is discussed in further detail below.

If it is determined that the key that triggered operation 602 is an inhibit key, procedure 600 continues to operation 614, where the inhibit page is requested from the inhibit key 106. Procedure 600 continues to operation 616 to determine whether the inhibit page requested from operation 614 was blank or valid. If it is determined the inhibit page was not valid, procedure 600 continues to operation 618 where a failure interface is displayed and the procedure continues to operation 608, where procedure 600 ends. If it is determined the inhibit page was valid and not blank, procedure 600 continues to conditional 622 to determine whether the record is a non-empty record and matches a door ID. If the record is an empty record or does not match a door ID, procedure 600 continues to operation 642 where the next record from the inhibit page is read and procedure 600 returns to conditional 622. If the record is not empty and matches a door ID, procedure 600 continues to operation 624 to set a matching door found flag.

Procedure 600 continues to conditional 626 to determine whether a passcode matches. If the passcode does not match, procedure 600 continues to operation 628 where an inhibit flag success is reset and procedure 600 continues to operation 640 where the appropriate supplemental diagnostic information for the record is set. From operation 640, procedure 600 continues to operation 642 and loops back to conditional 622 as noted above. If the passcode matches, conditional 626 continues to conditional 630 to determine whether the tour success flag was set for the record. If the tour success flag was set for the record, procedure 600 continues to operation 640. If the tour success flag was not set for the record, procedure 600 continues to operation 632 where the serial number and attribute is copied to a user database in memory 111 of the lock device 102.

From operation 632, procedure 600 continues to conditional 634 to determine whether the copy was successful. If the copy was not successful, procedure 600 continues to operation 636 where the inhibit success flag is reset and procedure 600 continues to conditional 638 to determine whether more records are in the inhibit page. If the copy was successful, procedure 600 continues to conditional 638. If it is determined there are more records in the inhibit page, procedure 600 continues to operation 640; otherwise, procedure 600 returns to operation 614.

If it is determined the inhibit page was valid and blank, procedure 600 continues to conditional 644 to determine whether a matching door was found. If a matching door was not found, a wrong lock interface is displayed and the procedure 600 continues to operation 608, where procedure 600 ends. If a matching door was found, procedure 600 continues to conditional 648 to determine whether the inhibit was successful. If the inhibit was successful, procedure 600 continues to operation 650, where a successful interface is displayed and the procedure continues to operation 608, where procedure 600 ends. If the inhibit was not successful, procedure 600 continues to operation 652, where a failure interface is displayed and the procedure continues to operation 608, where procedure 600 ends.

As previously noted, if it is determined that the key that triggered operation 602 is not an inhibit key 106, procedure 600 continues to residential key logic sub-procedure 660 at conditional 662 to determine whether the residential key ID is in a lock access database 111. If the residential key ID is in the lock access database 111, procedure 600 continues to conditional 674 to determine whether the user in the lock device has the attribute set to DWA (delete with alarm). If the user in the lock device does not have the attribute set to DWA, procedure 600 continues to conditional 676 to determine a new flag is set for the lock device 102. If the new flag is set for the lock 102, procedure 600 continues to operation 682 where data from the residential key 104 is copied to the lock database 111 and procedure 600 continues to operation 684 where the new flag is cleared. Procedure 600 then continues from operation 684 to operation 686 where an access control decision is made, then procedure 600 continues to operation 608, where procedure 600 ends. If the new flag is not set for the lock, procedure 600 continues to conditional 678 to determine whether the lock device 102 is listed in the residential key 104. If the lock device 102 is not listed in the residential key 104, procedure 600 continues to operation 680, where access is denied and procedure 600 continues to operation 608, where procedure 600 ends.

If it is determined that the residential key ID is not in the lock access database 111 at conditional 662, procedure 600 continues to conditional 664 to determine whether the passcode in the residential key 104 matches information in the lock device 102. If it is determined the passcode in the residential key 104 matches information in the lock device 102, procedure 600 continues to conditional 666 to determine whether the new flag is set for the lock device 102. If the new flag is set for the lock device 102, procedure 600 continues to conditional 668 to determine whether the residential key ID in a Replacement ID field or a Previous Replacement ID field is the same as the residential key ID in the access database 111 for a specified user position. If the residential key ID in the Replacement ID field or a the previous Replacement ID field is the same as the residential key ID in the access database 111 for the specified user position, procedure 600 continues to operation 670 where the data from the residential key 104 is copied to the lock database 111. Procedure 600 continues from operation 670 to operation 672 where the new flag is cleared, and procedure 600 continues to operation 686 where an access control decision is made by the lock device 102, as noted above.

If it is determined the passcode in the residential key 104 does not match information in the lock device 102 at conditional 664, or if it is determined the new flag is not set for the lock device 102 at conditional 666, or if it is determined the residential key ID in the Replacement ID field and the Previous Replacement ID field is not the same as the residential ID in the access database 111 for the specified user position at conditional 668, or if it is determined the user in lock device 102 does not have the attribute set to DWA at conditional 674, procedure 600 continues to operation 686 where an access control decision is made by the lock device 102, as noted above.

Figure 7:
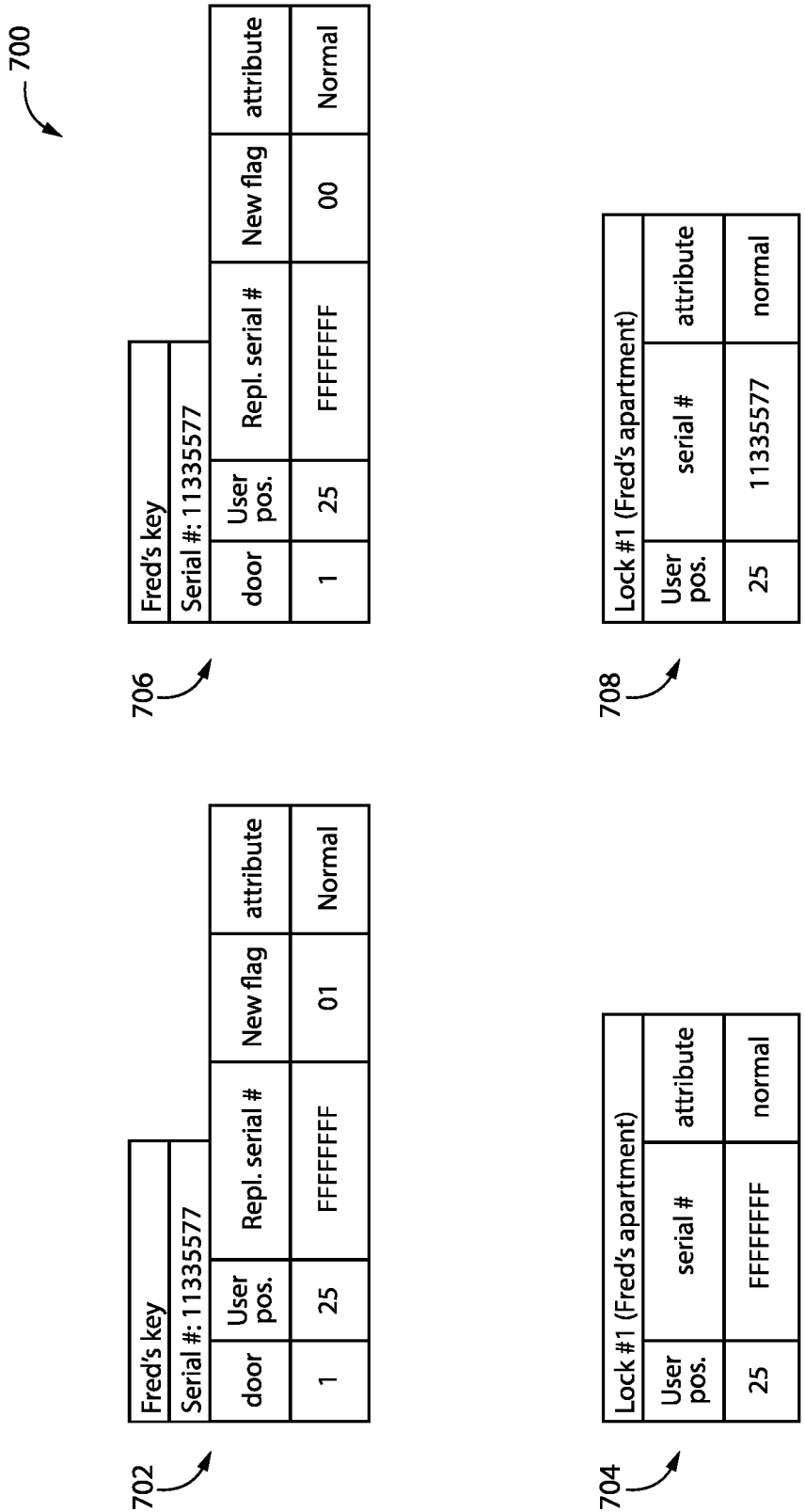
FIG. 7 is a schematic diagram of an exemplary use case for adding a user to a lock device.

FIG. 7 is a schematic diagram of an exemplary use case 700 for adding a user to the lock device 102 using the residential key 104. In the use case 700, the residential key 104 is programmed by the computer 108. The residential key 104 includes a data field 702 that illustrates the replacement serial number for user position 25 and the new flag is set to 1. The data field 704 for the lock device 102 has the old serial number in user position 25. The data field 706 illustrates the changes in the data field after the residential key 104 has been touched to the lock device 102. As seen in data field 706, the new flag has been set to 00. The data field 708 illustrates the changes in the data field in the lock device 102 after being updated by the residential key 104. In particular, the data field 708 now has the updated serial number stored in user position 25.

Figure 8A:
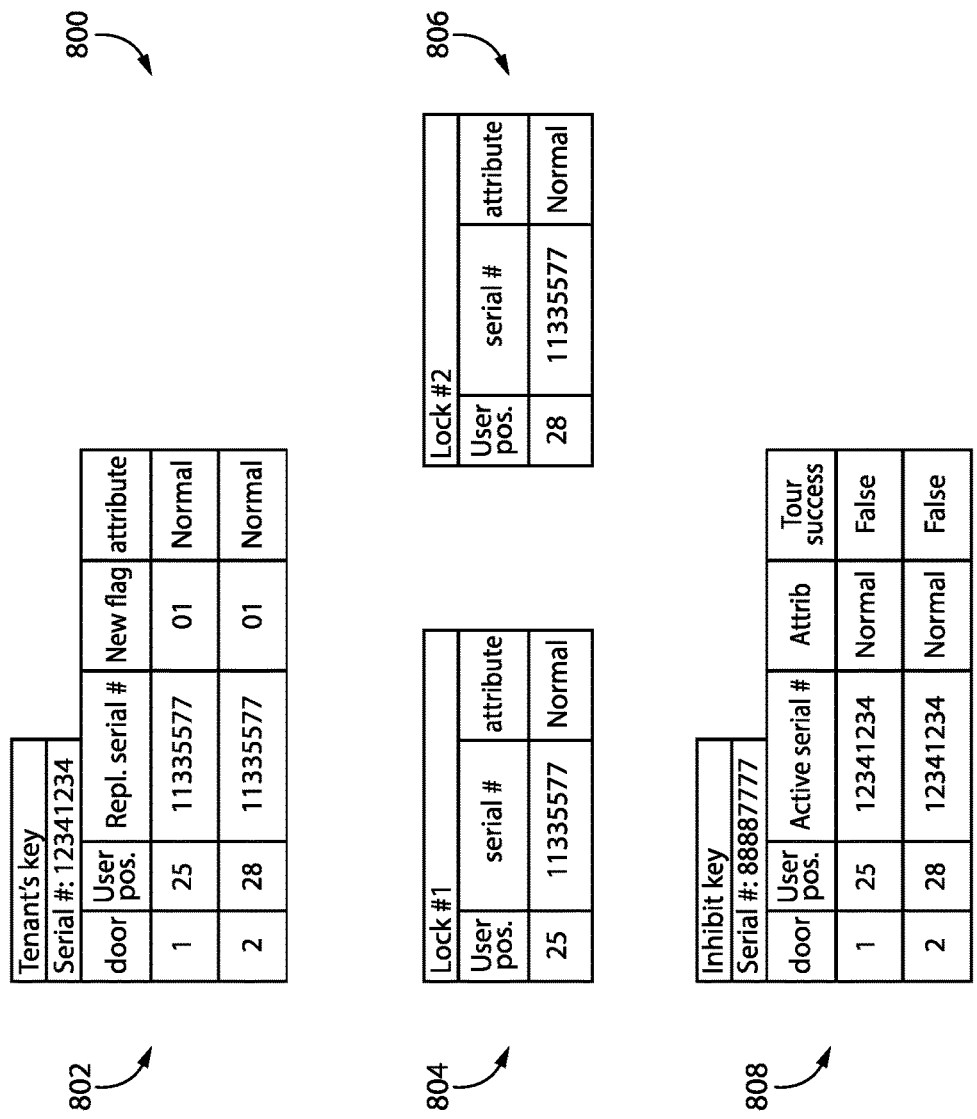
FIGS. 8A-8D are schematic diagrams of an exemplary use case for inhibiting a user from a lock device.
Figure 8B:
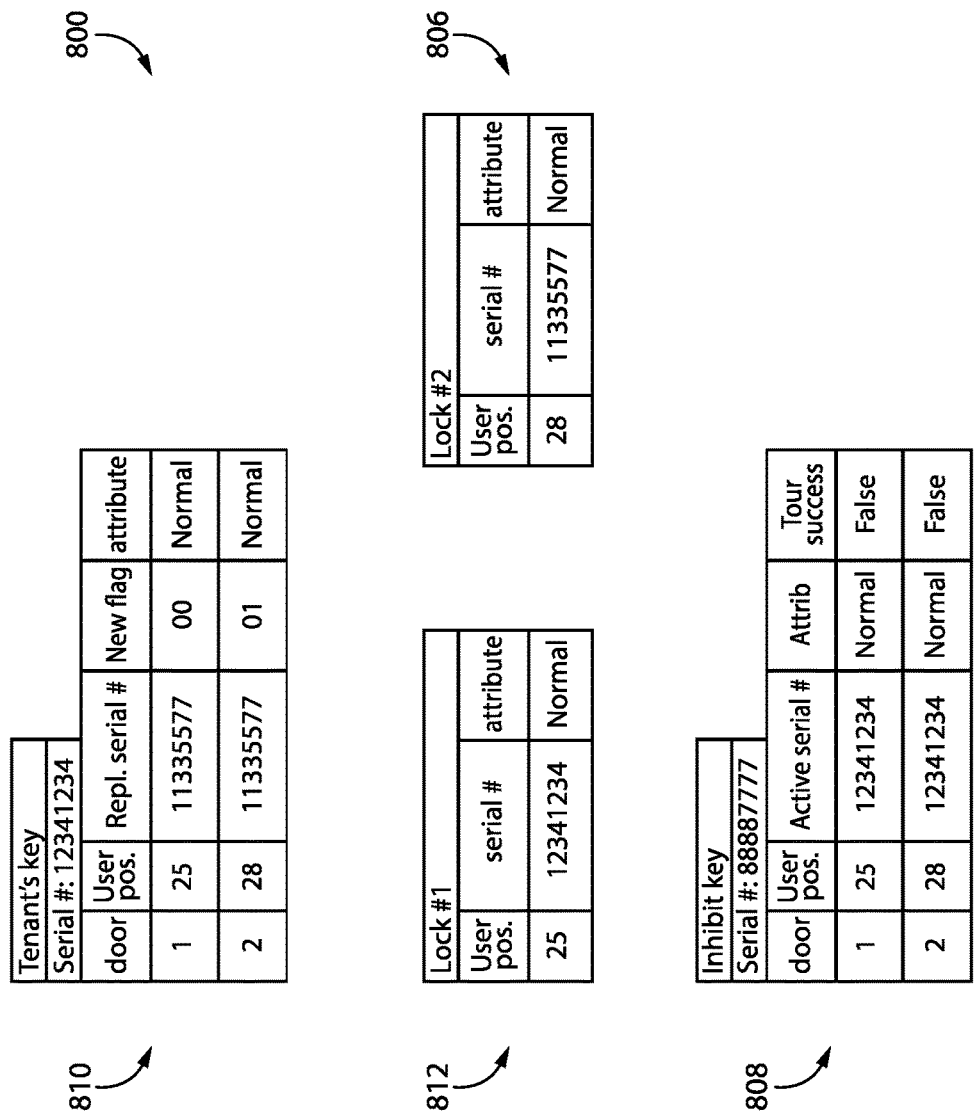
Figure 8C:
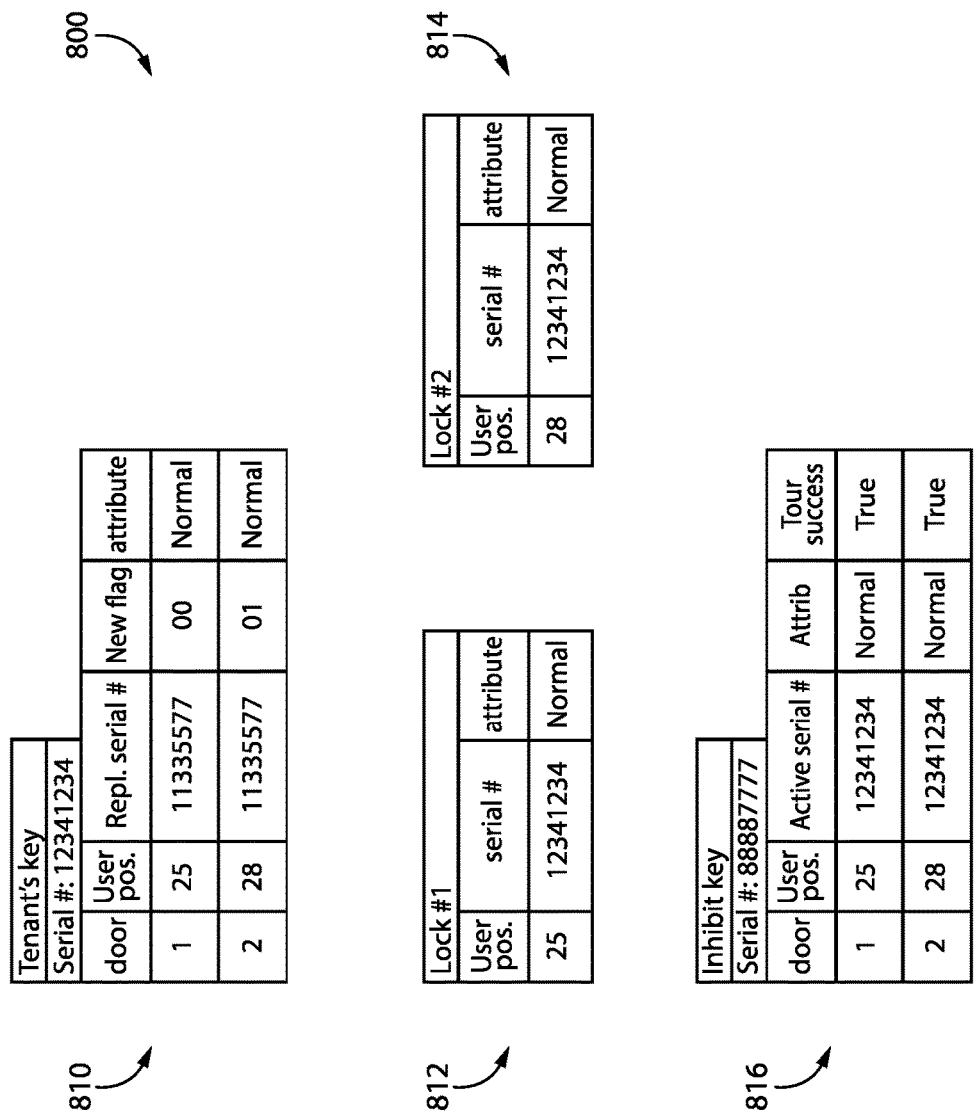
Figure 8D:
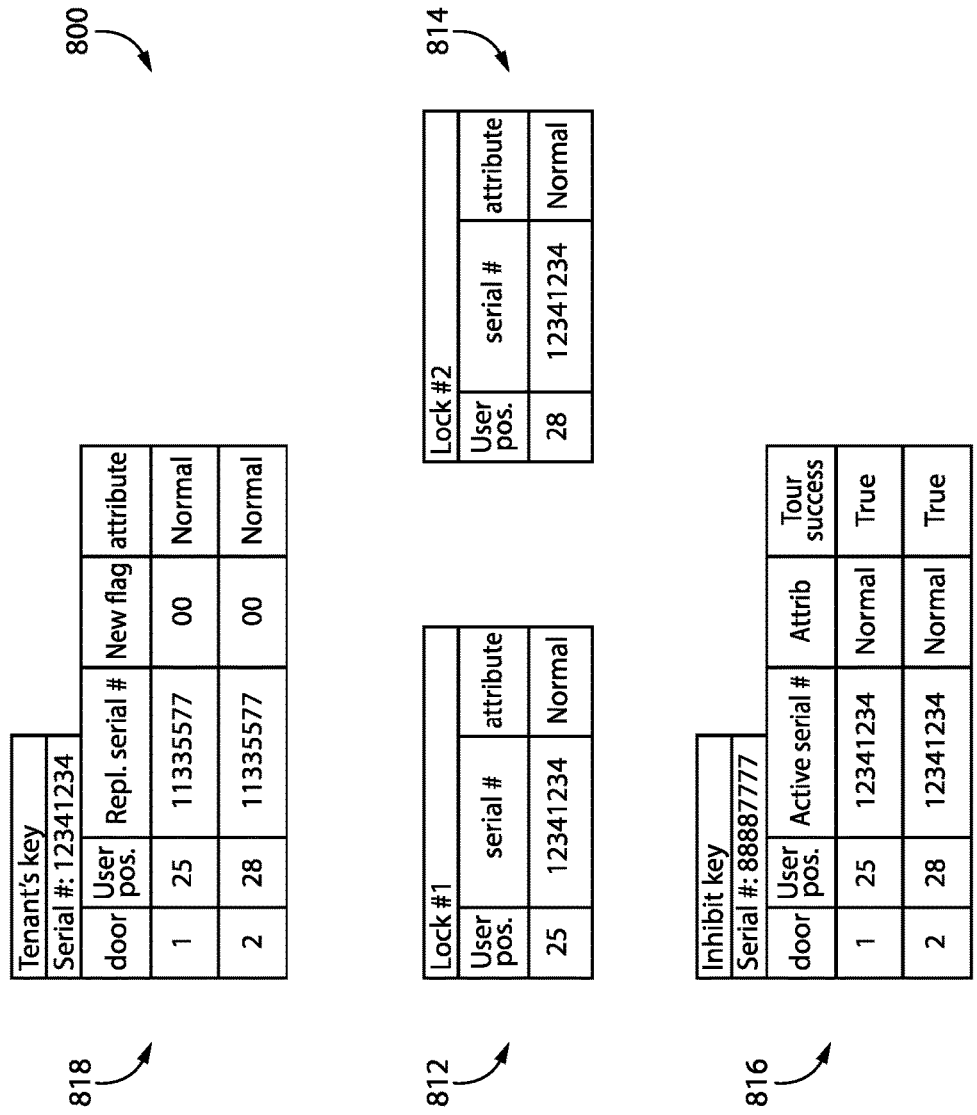

FIGS. 8A-8D are schematic diagrams of an exemplary use case 800 for inhibiting a user from the lock device 102 using the inhibit key 106. FIG. 8A illustrates the data filed 802 for a residential key 104, the data field 804 of a first lock device 102, the data field 806 of a second lock device 102, and the data field 808 of an inhibit key 106 are shown before the residential key 104 or the inhibit key 106 have been applied to either of the lock device 102. The data fields 802 of the residential key 104 programmed by the computer 108 include a 01 for New flag. The data fields 808 of the inhibit key 106 include False for the Tour Success field. FIG. 8B illustrates the various data fields after the residential key 104 has been applied one of the lock devices 102. As seen in FIG. 8B, the New flag for User position 25 in the residential key data filed 810 has changed to 00 meaning one of the lock devices 102 was updated. The data field 812 has been updated to include the serial number of the residential key 104. FIG. 8C illustrates the updated data fields 812, 814, and 816 after the inhibit key 106 has been applied to both lock devices 102. Similar to FIG. 8B, FIG. 8D illustrates the updated data fields 818 and 814 after the residential key 104 has been applied to the second lock device 102.

FIGS. 9A-9D are schematic diagrams of an exemplary use case 900 for removing a lost key from a lock device 102. FIG. 9A illustrates the data fields 902 and 904 after the user has applied the residential key 104 to the lock device 102. The serial number for the residential key 104 is stored in the correct user position in the data field 904 of the lock device 102. FIG. 9B illustrates the data field 906 for the replacement residential key 104 that was issued after the original residential key 104 was lost. FIG. 9C illustrates the updated data fields 908 and 910 after the residential key 104 has been applied to the lock device 102. FIG. 9D illustrates the data field 902 of the lost residential key 104 and that it was denied access to the lock device 102 based on the data in the data field 910.

Figure 10A:
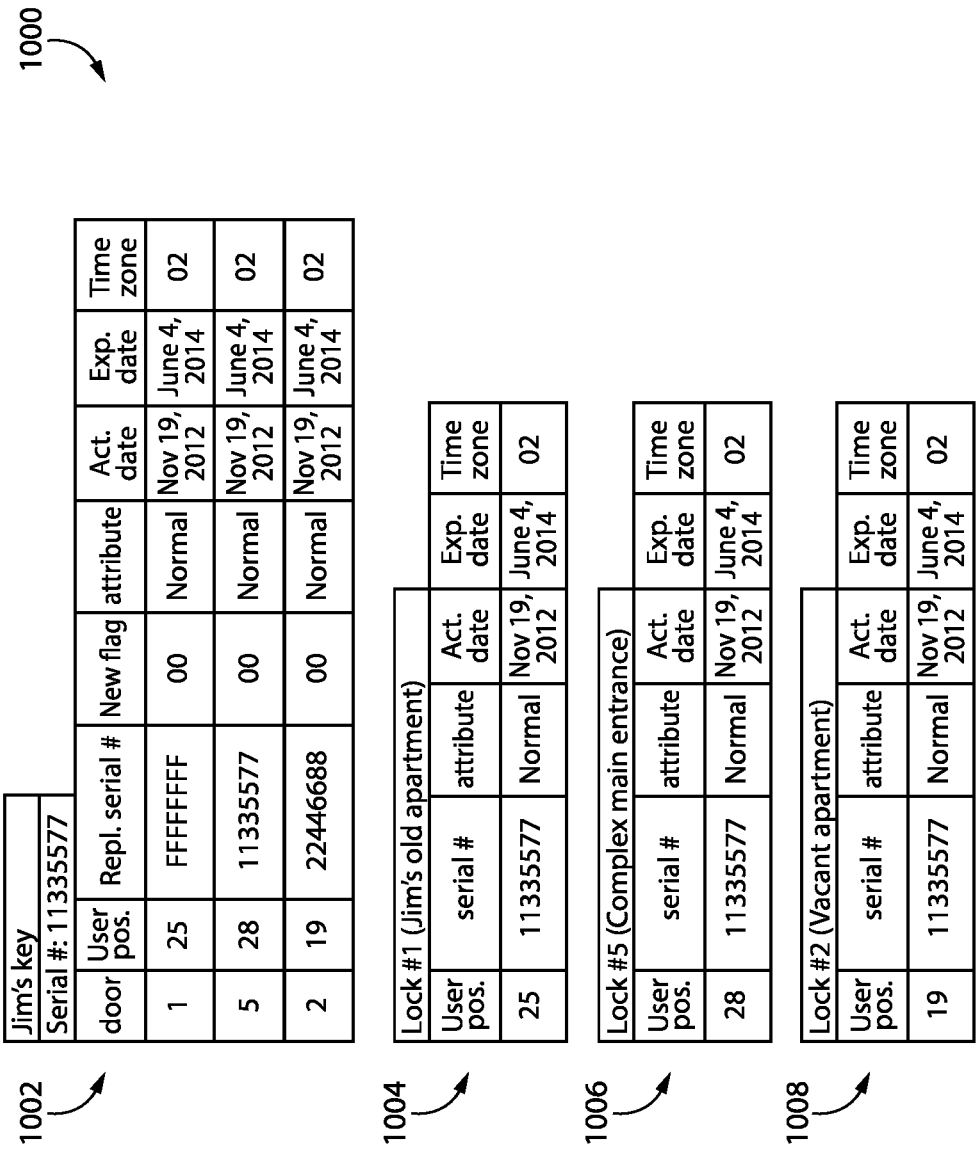
Figure 10B:
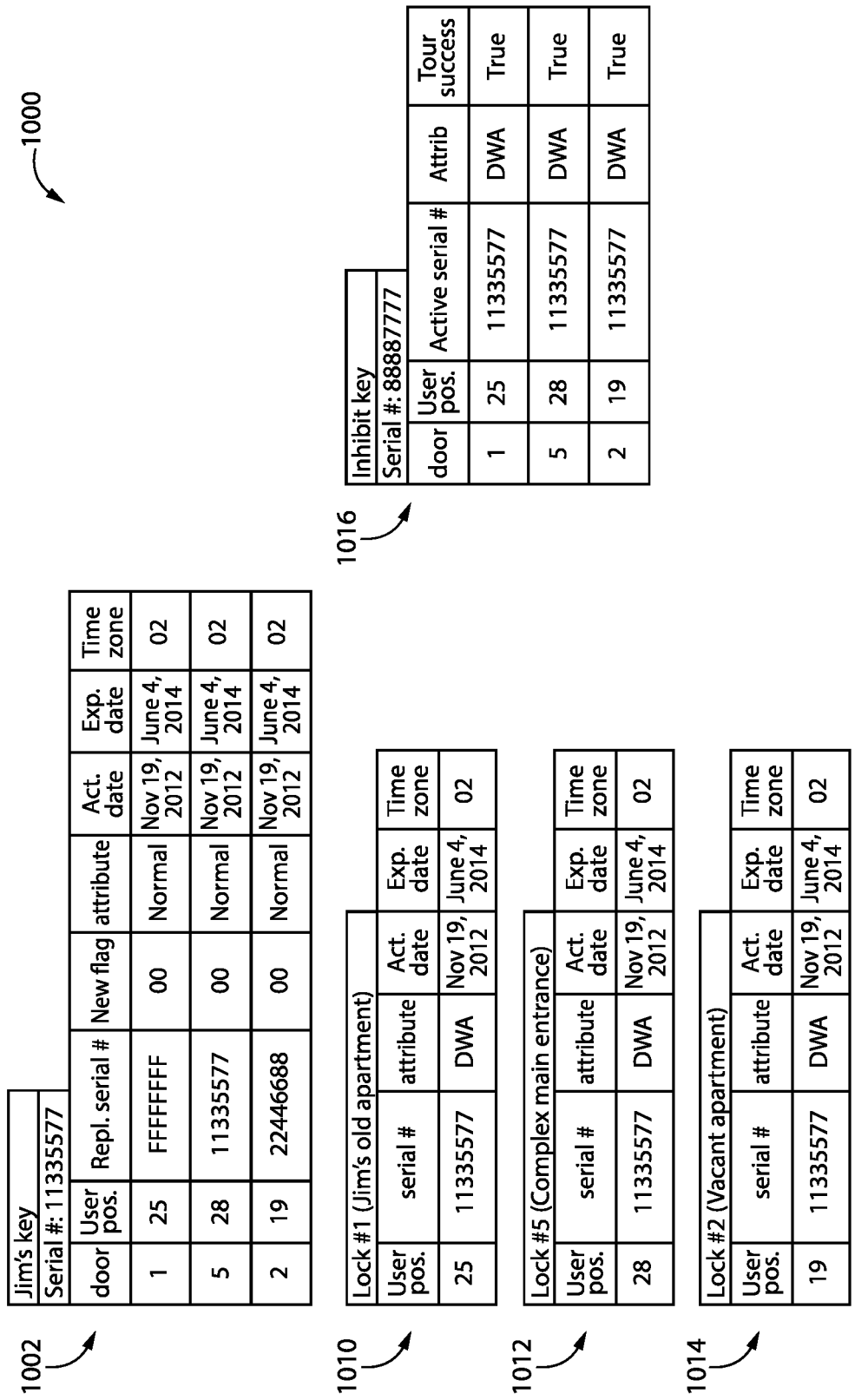
Figure 10C:
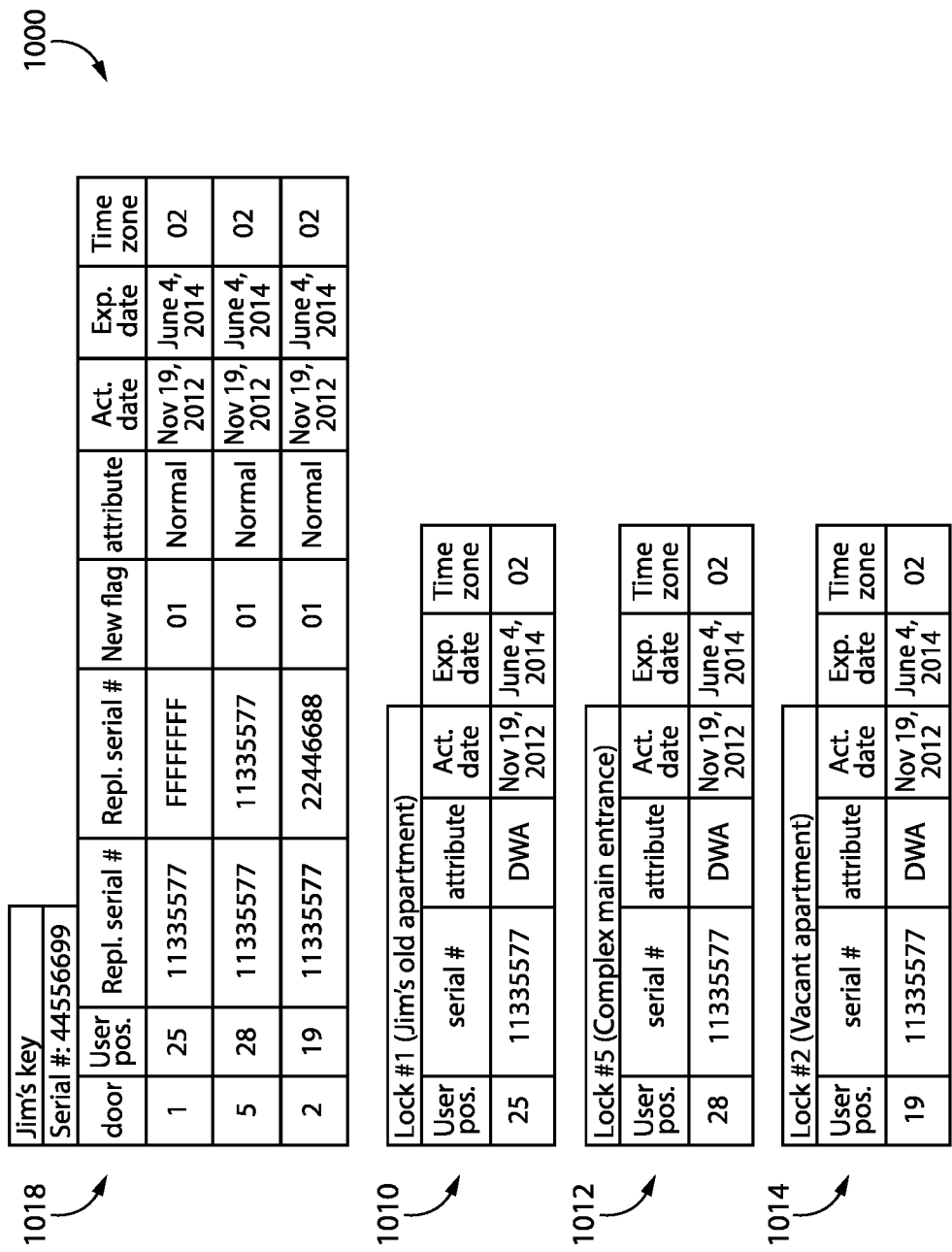
Figure 10E:
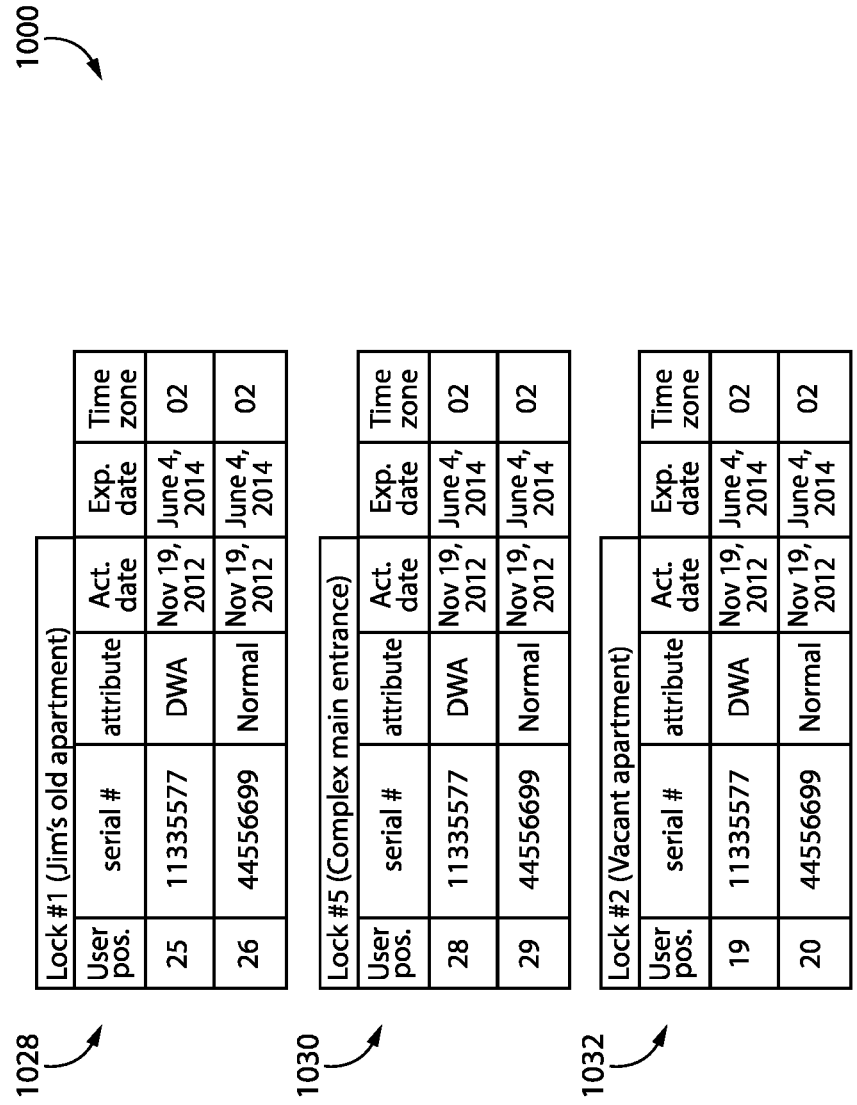

FIGS. 10A-10E are schematic diagrams of an exemplary use case 1000 for re-enabling an inhibited a user from a lock device 102. FIG. 10A illustrates the various data fields 1002, 1004, 1006, and 1008 before the user's access rights have been inhibited. FIG. 10B illustrates the updated data fields 1010, 1012, 1014, and 1016 after an inhibit key 106 was applied to three lock devices 102. FIG. 10C illustrates the data field 1018 of a residential key 104 that is a new key with a new serial number. FIG. 10D illustrates the updated data fields 1020, 1022, 1024, and 1026 after the residential key 104 with data field 1020 was applied to all three lock devices 102. The computer 108 had the new key's serial number use the same slot in the lock devices 102 as the old key. FIG. 10E illustrates that if the computer 108 had used a different slot in the lock devices 102 then the original slots would have had DWA (delete with alarm). In this case, if administrator wanted to update the data fields 1028, 1030, and 1032 to get the original key to work on the lock devices 102, then the administrator would have to program the three lock devices 102 using a handheld device to revert the DWA attribute back to Normal.

The processes in the present application may be implemented in operating logic 208 as operations by software, hardware, artificial intelligence, fuzzy logic, or any combination thereof, or at least partially performed by a user or operator. In certain embodiments, modules represent software elements as a computer program encoded on a computer readable medium, wherein the lock device 102 and/or the computer 108, performs the described operations when executing the computer program.

The present application may include one or more of the following features. The system 100 may eliminate having to tour with a handheld computer. The system 100 may not require either the residential key 104 or the inhibit key 106 to be returned back to a central database to indicate the lock devices 102 that have had their memory updated. The system 100 may not require a Hotspot reader. As another example, if a key is returned, the key may have the ability to show diagnostic information relating the lock device 102 the key touched. This applies regardless if the key was a residential key 104 or an inhibit key 106. As yet another example, the system 100 may provide the ability to generate keys (e.g., residential keys 104 and/or inhibit keys 106) that can sync up information between the central database 116 at the computer 108 and the lock device(s) 102 if a sync issue is detected. Keys (e.g., residential keys 104 and/or inhibit keys 106) can sync more than one lock device 102 per key.

One aspect of the present application may include a method, comprising: programming a user key with new access rights information; determining, with a lock device, whether the user key is authorized to update the lock device based on data in the user key; and updating a memory of the lock device with the new access rights information if the user key is authorized to update the lock device.

Features of the aspect of the present application may include: programming an inhibit key with new inhibit rights information; receiving the new inhibit rights information at the lock device from the inhibit key; and inhibiting a particular user by modifying a database in the memory to designate the user as inhibited; writing, with the lock device, update confirmation data to the inhibit key; storing the new access rights information in a database in the memory; writing, with the lock device, update confirmation data to the user key; downloading the new access rights information to a computer from a server; and programming the user key with the new access rights information via the computer; wherein the user key is a residential key.

Another aspect of the present application may include: programming an administrative key with new rights information; determining, with a lock device, whether the administrative key is authorized to update the lock device based on data in the administrative key; and updating a database of the lock device with the new rights information if the administrative key is authorized to update the lock device.

Features of the aspect of the present application may include: wherein the administrative key is an inhibit key; programming access rights into a residential key with a computer; determining, with a lock device, whether the residential key is authorized to update the lock device based on data in the residential key; and updating the database of the lock device with the access rights if the residential key is authorized to update the lock device; writing, with the lock device, update confirmation data to the residential key; downloading the access rights to a computer from a server; and programming the residential key with the access rights information via the computer; writing, with the lock device, update confirmation data to the administrative key.

Yet another aspect of the present application may include a system, comprising: a computer configured with non-transitory computer executable instructions to download new access rights information from a server; and a plurality of keys, wherein at least one key is a residential key and at least one key is an inhibit key, wherein the computer is configured to write the new access rights information to the residential key, and wherein the computer is configured to write inhibit information to the inhibit key; and a lock device configured with non-transitory computer executable instructions to determine whether the residential key is authorized to update the lock device based on data in the residential key, update a database of the lock device with the new access rights if the residential key is authorized to update the lock device, determine whether the inhibit key is authorized to update the lock device based on data in the inhibit key, and update the database of the lock device with the inhibit information if the inhibit key is authorized to update the lock device.

One aspect of the present application may include a method, comprising: programming a user key with new access rights information including an activation date and an expiration date for access privileges for a particular user key; determining, with a lock device, whether the user key is authorized to update the lock device based on data in the user key; and updating a memory of the lock device with the new access rights information if the user key is authorized to update the lock device.

Features of the aspect of the present application may include: programming an inhibit key with new inhibit rights information; receiving the new inhibit rights information at the lock device from the inhibit key; and inhibiting an old user key by modifying a database in the memory to designate the old user key as inhibited; writing, with the lock device, update confirmation data to the inhibit key; wherein the new inhibit rights information includes a delete-with-alarm flag set, wherein the lock device is structured to indicate an alarm when the old user key is presented; storing the new access rights information in a database in the memory; writing, with the lock device, update confirmation data to the user key; downloading the new access rights information to a computer from a server; and programming the user key with the new access rights information via the computer; granting access to the user key when the user key is presented to the lock device; and denying access to an old user key when the old user key is presented to the lock device, wherein the user key and the old user key are of a residential key type; wherein the user key is an iButton; wherein the user key is a smart card; wherein the user key programmed with the new access rights information is different than the particular user key.

Another aspect of the present application includes a method, comprising: programming an administrative key with new rights information including a delete-with-alarm data field; determining, with a lock device, whether the administrative key is authorized to update the lock device based on data in the administrative key; and updating a database of the lock device with the new rights information if the administrative key is authorized to update the lock device.

Features of the aspect of the present application may include: wherein the administrative key is an inhibit key; programming access rights into a residential key with a computer; determining, with a lock device, whether the residential key is authorized to update the lock device based on data in the residential key; and updating the database of the lock device with the access rights if the residential key is authorized to update the lock device; writing, with the lock device, update confirmation data to the residential key; downloading the access rights to the computer from a server; and programming the residential key with the access rights information via the computer; writing, with the lock device, update confirmation data to the administrative key.

Yet another aspect of the present application may include a system, comprising: a computer configured with non-transitory computer executable instructions to download new access rights information from a server; and a plurality of keys, wherein at least one key is a residential key and at least one key is an inhibit key, wherein the computer is configured to write the new access rights information to the residential key including an activation date and an expiration date for access privileges for a particular residential key, and wherein the computer is configured to write inhibit information to the inhibit key including a delete-with-alarm setting; and a lock device configured with non-transitory computer executable instructions to determine whether the residential key is authorized to update the lock device based on data in the residential key, update a database of the lock device with the new access rights if the residential key is authorized to update the lock device, determine whether the inhibit key is authorized to update the lock device based on data in the inhibit key, and update the database of the lock device with the inhibit information if the inhibit key is authorized to update the lock device.

Features of the aspect of the present application may include: wherein the residential key is an iButton; wherein the residential key is a smart card.

While the invention has been described in connection with what is presently considered to be the preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
    programming a user key with new access rights information associated with access privileges for a particular user key;
    setting a flag in a flag data field of the user key;
    analyzing, by a lock device, data stored in the user key;
    updating a memory of the lock device with the new access rights information in response to:
        determining, based on the data stored in the user key, that the user key is authorized to update the lock device; and
        determining, based on the data stored in the user key, that the user key is associated with the lock device and/or a facility of the lock device; and
    clearing the flag in the flag data field in response to updating the memory of the lock device with the new access rights information.

2. The method of claim 1, wherein the user key programmed with the new access rights information is different than the particular user key.

3. The method of claim 1, wherein updating the memory of the lock device with the new access rights information comprises updating the memory to revoke access permissions of a previous user key authorized to access the lock device.

4. The method of claim 1, further comprising receiving, by a computer, the new access rights information from an access control server; and
    wherein programming the user key with the new access rights information comprises programming the user key using the computer.

5. The method of claim 1, wherein the user key is a smart card.

6. The method of claim 1, wherein the new access rights information comprises an identifier of the user key; and
    wherein the identifier of the user key is different from an identifier of the previous user key authorized to access the lock device.

7. A method, comprising:
    programming a memory of a first key with new rights information for at least one residential key, wherein the new rights information indicates to set a delete-with-alarm data field of a database of a lock device for one or more of the at least one residential key;
    determining, by the lock device, whether the first key is authorized to update the lock device based on data in the first key; and
    updating the database of the lock device with the new rights information if the first key is authorized to update the lock device.

8. The method of claim 7, wherein the first key is different from the residential key.

9. The method of claim 7, further comprising:
    programming access rights into a memory of a new residential key;
    determining, by the lock device, whether the new residential key is authorized to update the lock device based on data in the memory of the new residential key; and
    updating the database of the lock device with the access rights if the new residential key is authorized to update the lock device, wherein updating the database comprises (i) replacing an identifier of a previously authorized residential key stored in the database with an identifier of the new residential key and (ii) updating the memory of the residential key to indicate the lock device has been updated.

10. The method of claim 7, wherein the first key is a smart card.

11. A lock device, comprising:
    a first processor; and
    a first memory having a first plurality of instructions stored thereon that, in response to execution by the first processor, causes the lock device to:
        analyze data stored in a user key, wherein the data stored in the user key comprises a flag data field and new access rights information associated with access privileges for a particular user key;
        update a database of the lock device with the new access rights information in response to a determination, based on the data stored in the user key, that the user key is authorized to update the lock device; and
        clear a flag in the flag data field in response to updating the database of the lock device with the new access rights information.

12. The lock device of claim 11, wherein the user key identifies the lock device.

13. The lock device of claim 11, wherein the flag data field indicates whether the user key has updated the lock device.

14. The lock device of claim 11, wherein the user key programmed with the new access rights information is different from the particular user key.

15. The lock device of claim 11, wherein the user key is a smart card.

16. The lock device of claim 15, wherein to update the database of the lock device with the new access rights information comprises to update the database in response to a determination that the user key includes the identifier of the previous user key authorized to access the lock device.

17. The lock device of claim 11, wherein the new access rights information comprises an identifier of the user key; and
    wherein the identifier of the user key is different from an identifier of the previous user key authorized to access the lock device.

18. The lock device of claim 11, wherein to update the database of the lock device with the new access rights information comprises to update the database in response to determinations that the user key is associated with the lock device and/or a facility of the lock device.

* * * * *